United States Patent
Liu et al.

(10) Patent No.: US 12,003,166 B2
(45) Date of Patent: Jun. 4, 2024

(54) DEVICE WITH STATOR AND ROTOR, AND WIND GENERATING SET

(71) Applicant: XINJIANG GOLDWIND SCIENCE & TECHNOLOGY CO., LTD., Xinjiang (CN)

(72) Inventors: Likun Liu, Beijing (CN); Yanhui Li, Beijing (CN); Liang Peng, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 71 days.

(21) Appl. No.: 17/756,268

(22) PCT Filed: Jun. 4, 2020

(86) PCT No.: PCT/CN2020/094455
§ 371 (c)(1),
(2) Date: May 20, 2022

(87) PCT Pub. No.: WO2021/098186
PCT Pub. Date: May 27, 2021

(65) Prior Publication Data
US 2022/0407386 A1 Dec. 22, 2022

(30) Foreign Application Priority Data
Nov. 21, 2019 (CN) .......................... 201911154878.X

(51) Int. Cl.
*H02K 7/12* (2006.01)
*F03D 1/06* (2006.01)
(Continued)

(52) U.S. Cl.
CPC ................. *H02K 7/12* (2013.01); *F03D 1/06* (2013.01); *G08B 21/182* (2013.01); *H02K 7/085* (2013.01);
(Continued)

(58) Field of Classification Search
CPC .......... H02K 7/12; H02K 7/085; H02K 7/183; H02K 11/21; H02K 2201/03; F03D 1/06
See application file for complete search history.

(56) References Cited

U.S. PATENT DOCUMENTS 4,289,970 A * 9/1981 Deibert ..................... F03D 9/25
416/DIG. 4
4,330,714 A * 5/1982 Smith ................... F03D 7/0224
416/DIG. 4
(Continued)

FOREIGN PATENT DOCUMENTS

| CN | 101655070 A | 2/2010 |
|---|---|---|
| CN | 101741151 A | 6/2010 |

(Continued)

OTHER PUBLICATIONS

International Search Report dated Sep. 3, 2020; PCT/CN2020/094455.
(Continued)

*Primary Examiner* — Pedro J Cuevas
(74) *Attorney, Agent, or Firm* — Frank Gao, Esq.

(57) ABSTRACT

Disclosed is a device with a stator and a rotor, the device comprising: a stator; a rotor, wherein an air gap is provided between the rotor and the stator; and an air gap protection device fixedly connected to the stator, wherein the radial distance between the air gap protection device and the rotor is less than the radial distance between the stator and the rotor, and the air gap protection device rotates relative to the rotor when in contact with the rotor. By arranging the air gap
(Continued)

protection device fixedly connected to the stator, the air gap protection device can rotate relative to the rotor when in contact with the rotor, and the radial distance between the air gap protection device and the rotor is less than the radial distance between the stator and the rotor.

20 Claims, 5 Drawing Sheets

(51) Int. Cl.
*G08B 21/18* (2006.01)
*H02K 7/08* (2006.01)
*H02K 7/18* (2006.01)
*H02K 11/21* (2016.01)

(52) U.S. Cl.
CPC ............. *H02K 7/183* (2013.01); *H02K 11/21* (2016.01); *H02K 2201/03* (2013.01)

(56) References Cited

U.S. PATENT DOCUMENTS

| | | | | |
|---|---|---|---|---|
| 4,478,082 A * | 10/1984 | Sato | G01N 29/12 | 73/660 |
| 4,720,640 A * | 1/1988 | Anderson | F03D 13/20 | 290/43 |
| 4,832,569 A * | 5/1989 | Samuelsen | F03D 3/068 | 416/17 |
| 5,315,159 A * | 5/1994 | Gribnau | H02K 7/1838 | 290/55 |
| 5,548,950 A * | 8/1996 | Paweletz | H02K 21/24 | 57/406 |
| 5,758,911 A * | 6/1998 | Gerhardt | F03D 5/04 | 290/55 |
| 6,064,123 A * | 5/2000 | Gislason | F03D 13/20 | 290/55 |
| 6,664,655 B2 * | 12/2003 | Vann | F03D 1/0608 | 290/55 |
| 6,791,222 B1 | 9/2004 | Maslov et al. | | |
| 6,952,058 B2 * | 10/2005 | McCoin | F03D 9/25 | 290/44 |
| 7,075,191 B2 * | 7/2006 | Davison | F03B 17/066 | 290/43 |
| 7,098,552 B2 * | 8/2006 | McCoin | F03D 9/25 | 290/55 |
| 7,116,006 B2 * | 10/2006 | McCoin | F03D 1/025 | 290/53 |
| 7,215,038 B2 * | 5/2007 | Bacon | F03D 1/0658 | 290/55 |
| 7,345,377 B2 * | 3/2008 | Bacon | F03D 15/20 | 290/43 |
| 7,417,334 B2 * | 8/2008 | Uchiyama | H02K 7/14 | 290/55 |
| 7,431,567 B1 | 10/2008 | Bevington et al. | | |
| 7,456,534 B2 * | 11/2008 | Engstrom | H02K 7/088 | 310/90 |
| 7,605,486 B2 * | 10/2009 | Bridwell | H02K 16/00 | 290/43 |
| 7,750,530 B2 * | 7/2010 | Dowhan | H02K 1/2791 | 310/265 |
| 7,825,532 B1 * | 11/2010 | Barber | H02K 7/08 | 290/43 |
| 7,902,684 B2 * | 3/2011 | Davison | F03B 17/064 | 290/55 |
| 7,944,069 B2 * | 5/2011 | Uchiyama | F03D 9/11 | 290/55 |
| 7,944,074 B2 * | 5/2011 | Longtin | F03D 7/02 | 310/90 |
| 8,109,727 B2 * | 2/2012 | Barber | F03D 7/0236 | 416/224 |
| 8,164,213 B2 * | 4/2012 | Mahaffy | F03D 7/06 | 416/17 |
| 8,174,142 B2 * | 5/2012 | Barber | F03D 9/25 | 416/41 |
| 8,222,762 B2 * | 7/2012 | Borgen | H02K 7/09 | 290/55 |
| 8,258,645 B2 * | 9/2012 | Barber | F03D 1/0608 | 290/55 |
| 8,362,731 B2 * | 1/2013 | Smith | H02K 7/088 | 318/400.41 |
| 8,373,298 B2 * | 2/2013 | Barber | H02K 9/19 | 290/55 |
| 8,401,822 B2 * | 3/2013 | Dimino | G01R 31/343 | 702/183 |
| 8,466,577 B2 * | 6/2013 | Barber | H02K 7/1869 | 290/43 |
| 8,987,959 B2 * | 3/2015 | Sortore | F16C 32/0459 | 310/90.5 |
| 9,124,153 B2 * | 9/2015 | Moller | H02K 7/1869 | |
| 9,382,899 B2 * | 7/2016 | Eriksen | H02K 7/088 | |
| 9,479,038 B2 * | 10/2016 | Smith | H02K 7/09 | |
| 9,562,518 B2 * | 2/2017 | Patel | F03D 9/25 | |
| 9,793,777 B2 * | 10/2017 | Hofmann | F03D 15/10 | |
| 9,932,969 B2 * | 4/2018 | Eriksen | F03D 9/25 | |
| 10,193,429 B2 * | 1/2019 | Smith | H02K 7/09 | |
| 11,277,056 B2 * | 3/2022 | Chernogorski | H02K 17/165 | |
| 11,845,474 B2 * | 12/2023 | Adam | B61C 3/00 | |
| 2006/0097582 A1 * | 5/2006 | Engstrom | H02K 7/088 | 310/10 |
| 2007/0040385 A1 * | 2/2007 | Uchiyama | F03D 13/20 | 290/44 |
| 2008/0088195 A1 * | 4/2008 | Dooley | H02K 1/2791 | 310/67 R |
| 2008/0284275 A1 * | 11/2008 | Dowhan | H02K 1/2791 | 310/265 |
| 2009/0243301 A1 | 10/2009 | Longtin et al. | | |
| 2010/0045047 A1 | 2/2010 | Stiesdal | | |
| 2011/0133479 A1 | 6/2011 | Stiesdal | | |
| 2011/0257934 A1 * | 10/2011 | Dimino | G01R 31/343 | 702/183 |
| 2011/0316376 A1 * | 12/2011 | Sortore | H02K 7/09 | 310/90.5 |
| 2012/0262095 A1 * | 10/2012 | Smith | H02P 25/024 | 310/90 |
| 2013/0119802 A1 * | 5/2013 | Smith | H02K 7/088 | 310/90 |
| 2013/0200630 A1 | 8/2013 | Sharples et al. | | |
| 2013/0277985 A1 * | 10/2013 | Moller | F03D 9/25 | 310/90 |
| 2014/0125064 A1 * | 5/2014 | Hofmann | H02K 7/1838 | 290/55 |
| 2014/0133985 A1 | 5/2014 | Mongeau | | |
| 2014/0167420 A1 | 6/2014 | Eriksen et al. | | |
| 2016/0237991 A1 * | 8/2016 | Eriksen | F03D 1/065 | |
| 2017/0040878 A1 * | 2/2017 | Smith | H02K 7/088 | |
| 2019/0245421 A1 * | 8/2019 | Smith | H02K 7/08 | |
| 2020/0220432 A1 * | 7/2020 | Chernogorski | H02K 1/32 | |
| 2023/0211812 A1 * | 7/2023 | Adam | B61C 9/44 | 105/34.1 |

FOREIGN PATENT DOCUMENTS

| | | |
|---|---|---|
| CN | 103867385 A | 6/2014 |
| CN | 105464899 A | 4/2016 |
| CN | 208236564 U | 12/2018 |
| CN | 209358302 U | 9/2019 |
| CN | 110943555 A | 3/2020 |
| DE | 102010042818 A1 | 4/2012 |
| EP | 2 333 934 A1 | 6/2011 |
| EP | 3001540 A1 | 3/2016 |

(56) References Cited

FOREIGN PATENT DOCUMENTS

EP        3 086 467 A1    10/2016
JP       2005086860 A    3/2005

OTHER PUBLICATIONS

Extended European Search Report dated Oct. 30, 2023; Appln. No. 20889607.6.
First Chilean Office Action dated Oct. 8, 2023; Appln. No. 202201315.

* cited by examiner

DEVICE WITH STATOR AND ROTOR, AND WIND GENERATING SET

This disclosure is a national phase application of PCT international patent application PCT/CN2020/094455, filed on Jun. 4, 2020 which claims priority to Chinese Patent Application No. 201911154878.X, titled "DEVICE WITH STATOR AND ROTOR, AND WIND GENERATING SET", filed with the China National Intellectual Property Administration on Nov. 21, 2019, which is incorporated herein by reference in its entirety.

FIELD

The present disclosure relates to the technical field of power generation, and in particular to a device with a stator and a rotor and a wind generating set.

BACKGROUND

An air gap of a generator refers to a gap between a stator and a rotor of the generator. A magnetic field induction between the stator and the rotor is weak if the air gap of the generator is too large, so that the efficiency of the generator is reduced, while the rotor will be eccentric during rotation due to the vibration of the generator or uneven load if the air gap of the generator is too small, which is easy to occur sweep-chamber and cause damage to the generator. Therefore, controlling the air gap to a reasonable value is a necessary condition to guarantee the normal operation of the generator.

An air gap real-time measurement and control device and a wind generating set are provided in the conventional technology. The air gap real-time measurement and control device provide multiple displacement sensors on the stator of the generator, and monitor the air gap at each measuring point of the generator through the data fed back by the displacement sensors. Although the variations of the air gap of the generator can be known through the displacement sensors, the sensors can only play a monitoring role, and cannot provide better protection when the air gap of the generator is too small. Therefore, the sensors cannot provide any effective protection measure if the air gap of the generator is too small and is not found in time, which may cause damage to the generator.

SUMMARY

Therefore, the technical problem to be solved according to the present disclosure is to overcome the defect that the air gap real-time measurement and control device in the conventional technology cannot provide any effective protection measure when the air gap of the generator is too small, which causes damage to the generator. Therefore, a device with a stator and a rotor and a wind generating set are provided, which can provide effective protection when the air gap is too small.

In a first aspect, a device with a stator and a rotor is provided, which includes:
  the stator;
  the rotor, where an air gap is formed between the rotor and the stator; and
  an air gap protection device fixedly connected to one of the stator and the rotor, in which a radial distance between the air gap protection device and the other one of the stator and the rotor is less than a radial distance between the stator and the rotor; and the air gap protection device rotates relative to the other one of the stator and the rotor when the air gap protection device is in contact with the other one of the stator and the rotor.

By providing the air gap protection device which is fixedly connected to one of the stator and the rotor, the air gap protection device can rotate relative to the other one of the stator and the rotor when the air gap protection device is in contact with the other one of the stator and the rotor, so that the stator and the rotor can guarantee a normal relative rotation relation. In addition, the radial distance between the air gap protection device and the other one of the stator and the rotor is less than the radial distance between the stator and the rotor, so that if the rotor rotates eccentrically and the radial distance between the rotor and the stator is reduced during the relative rotation of the rotor and the stator, it can guarantee that the air gap protection device is in contact with one of the rotor and the stator firstly, and the stator is not in contact with the rotor, which avoids the occurrence of sweep-chamber. In addition, it can guarantee that the device with the stator and the rotor may not be damaged, that is, effective protection can be provided when the air gap between the stator and the rotor is too small, which improves the operation stability of the device with the stator and the rotor.

The air gap protection device includes:
  a body fixedly connected to the stator; and
  at least one rotating structure, which is connected to an end of the body close to the rotor, where a radial distance between the rotor and the at least one rotating structure is less than the radial distance between the stator and the rotor.

By providing the air gap protection device with the body fixedly connected to the stator and the at least one rotating structure, the body can be fixed to the stator, and the at least one rotating structure can rotate relative to the rotor, so that the stator and the rotor may not be affected when realizing their respective functions, which improves the stability of the stator and the rotor.

A maximum gap between the at least one rotating structure and the rotor in a radial direction is set within an allowable value range of the air gap.

By setting the maximum gap between the at least one rotating structure and the rotor in the radial direction within the allowable value range of the air gap, the gap between the at least one rotating structure and the rotor can meet the requirement of normal operation during the normal operation of the stator and the rotor, which guarantees the normal operation of the stator and the rotor.

The number of the at least one rotating structure is greater than one, each rotating structure has an cylindrical structure with an axis arranged along an axial direction of the air gap protection device, a surface of each rotating structure facing the rotor is a mating surface, a line on the mating surface with a smallest distance to the rotor is a mating line, and a curved surface passing through all the mating lines and a curved surface of the rotor facing the stator are arranged concentrically.

By providing multiple of rotating structures, each rotating structure being with the cylindrical structure, the curved surface passing through all the mating lines and the curved surface of the rotor facing the stator are arranged concentrically, so that the two curved surfaces are more compatible, a contact area between the rotor and each rotating structure is larger, and the friction force per unit area between the rotor and each rotating structure is smaller, so that the rotor rotates more smoothly.

The number of the at least one rotating structure is greater than one, each rotating structure has a spherical structure, a surface of each rotating structure facing the rotor is a mating surface, a point on the mating surface with a smallest distance to the rotor is a mating point, a curved surface passing through all the mating points and a curved surface of the rotor facing the stator are arranged concentrically.

The at least one rotating structure is made of wear-resistant non-metallic material.

The at least one rotating structure is arranged to be made of wear-resistant non-metallic material, so that the at least one rotating structure has a good lubrication performance, small elastic modulus and less impact and friction resistance when the rotor is in contact with the at least one rotating structure.

The multiple rotating structures are made of polyurethane or polyether ether ketone.

Each rotating structure includes:
a rotating shaft fixedly connected to the body;
a rotating portion, which is connected to the body and coaxially arranged outside the rotating shaft, and is configured to rotate relative to the rotating shaft when the rotating portion is in contact with the rotor.

Each rotating structure includes:
a bearing fixedly connected to the rotating shaft and arranged between the rotating shaft and the rotating portion.

By arranging the bearing between the rotating shaft and the rotating portion, the rotation efficiency between the rotating shaft and the rotating portion can be improved, and a radial accuracy can be improved.

The air gap protection device further includes at least two positioning plates, which are respectively connected to two sides of the body, and the at least two positioning plates are fixedly connected to the rotating shaft.

The at least two positioning plates are fixedly connected to the two sides of the body, and the at least two positioning plates are fixedly connected to the rotating shaft, so that the at least two positioning plates can be fixed to the two axial ends of the rotating shaft, which can prevent the rotating shaft from sliding off the body axially and facilitate the assembly and the disassembly.

At least one end of the rotating shaft is provided with a stepped boss or a groove, the positioning plate is pressed against the at least one end of the rotating shaft, and the positioning plate is provided with a groove or a boss which is matched and connected with the boss or the groove.

The at least one end of the rotating shaft and the positioning plate are provided with the stepped boss and the groove which are matched and connected, and the positioning plate is pressed against the at least one end of the rotating shaft, which can prevent the rotating shaft from rotating circumferentially, so that the rotating shaft is fixed more firmly, and the disassembly and mounting are convenient.

The rotating portion is a roller.

The rotating portion is configured to be the roller, so that the friction of the rotor in contact with the rotating portion is rolling friction, and the impact force of the rotor is reduced by using a rotating circumferential surface, which prevents sudden collision between the rotor and the rotating portion, and simplify the structure for realizing the rotation of the rotating portion.

An end of the body away from the rotor is provided with a protruding portion and at least one fixing bracket, the at least one fixing bracket is arranged on at least one side of the protruding portion, and the at least one fixing bracket is fixedly connected to the stator.

The at least one fixing bracket is fixedly connected to the stator through a second bolt.

At least four protruding portions are evenly provided in an end surface of the stator along a circumferential direction, and each protruding portion is fixedly connected to the air gap protection device.

The at least four protruding portions are provided in the end surface of the stator along the circumferential direction, and each protruding portion is fixedly connected to the air gap protection device, so that the stator is provided with one air gap protection device at most every 90 degrees along the circumferential direction, so that the rotor can firstly in contact with the roller of the air gap protection device no matter which parts in the circumferential direction the rotor is close to the stator when the rotor is eccentric, which can guarantee the normal operation of the stator and the rotor.

The rotor includes:
a rotor end cover arranged spaced apart from the at least one rotating structure;
a rotor bracket fixedly connected to the rotor end cover; and
a magnetic yoke arranged on the rotor bracket, in which a magnetic pole is provided on the magnetic yoke, and an air gap is formed between the magnetic pole and the stator.

The device with the stator and the rotor is a generator.

The generator includes:
a displacement sensor, where the displacement sensor is fixedly connected to the stator, and configured to detect the air gap between the stator and the rotor.

The generator includes:
a control device connected to the displacement sensor;
an alarm device connected to the control device;
in which the control device is configured to control the alarm device to send an alarm signal when a detection value of the displacement sensor is less than a preset value.

By providing the displacement sensor, the control device and the alarm device, it can detect the distance between the stator and the rotor in real time, and can control the alarm device to send the alarm signal when the air gap between the stator and the rotor is less than the preset value, so as to promptly remind an operation and maintenance personnel to perform maintenance, and thus guarantee the normal use of the generator.

In another aspect, a wind generating set is provided, which includes the device with the stator and the rotor.

BRIEF DESCRIPTION OF THE DRAWINGS

In order to illustrate the technical solutions in the embodiments of the present application or in conventional technology clearer, the drawings referred to for describing the embodiments or the conventional technology will be briefly described below. Apparently, the drawings in the following description show only some embodiments of the present application, and those skilled in the art can obtain other drawings according to the drawings without any creative work.

Figure 1:
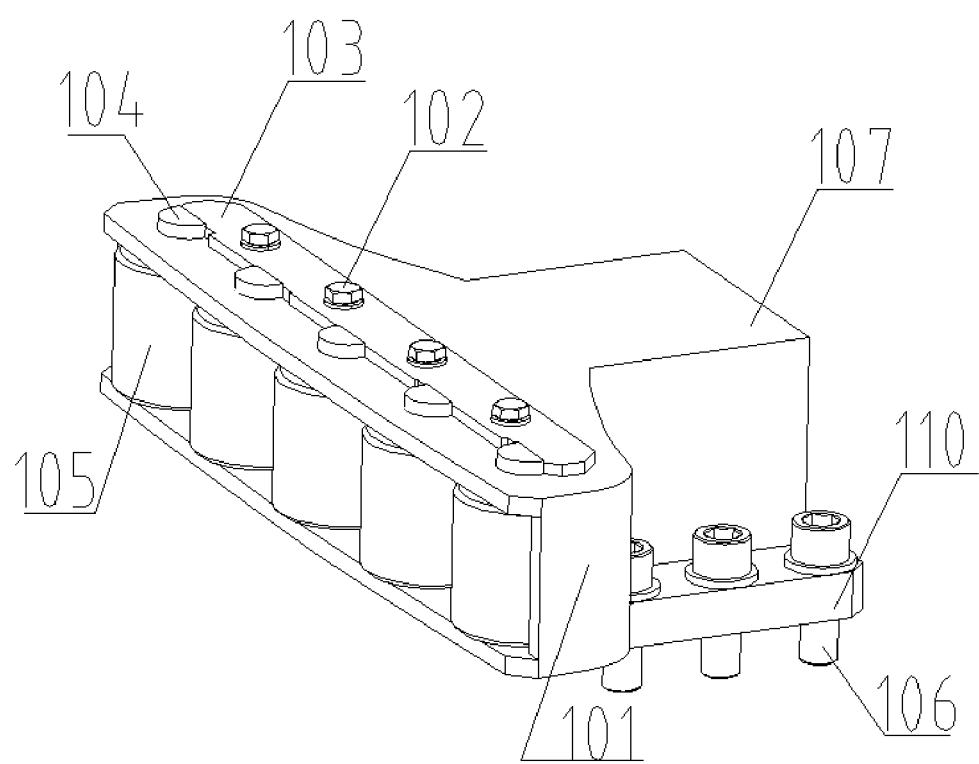
FIG. 1 is a schematic structural view of an air gap protection device according to the present disclosure.

The reference numerals are:

| 100, air gap protection device; | 101, body; |
|---|---|
| 102, first bolt; | 103, positioning plate; |
| 104, rotating shaft; | 105, roller; |
| 106, second bolt; | 107, protruding portion; |
| 109, stepped boss; | 110, fixing bracket; |
| 200, stator; | 201, protruding portion; |
| 300, rotor; | 301, rotor end cover; |
| 302, rotor bracket; | 303, magnetic pole; |
| 400, displacement sensor; | 500, control device; |
| 600, alarm device; | |
| A, radial distance between the air gap protection device and the rotor; | |
| B, radial distance between the stator and the rotor. | |

DETAILED DESCRIPTION OF THE EMBODIMENTS

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All other embodiments obtained based on the embodiments of the present application by those skilled in the art without any creative efforts fall within the protection scope of the present application.

In addition, the technical features involved in different embodiments of the present application described below can be combined with each other as long as they do not conflict with each other.

As shown in FIGS. 1 to 5, a device with a stator and a rotor is provided according to an embodiment of the present disclosure, which includes a stator 200, a rotor 300 and an air gap protection device 100.

A radial distance between the stator 200 and the rotor 300 is an air gap. The air gap protection device 100 is fixedly connected to one of the stator 200 and the rotor 300, and a radial distance between the air gap protection device 100 and the other one of the stator 200 and the rotor 300 is less than the radial distance between the stator 200 and the rotor 300; and the air gap protection device 100 rotates relative to the other one of the stator 200 and the rotor 300 when the air gap protection device 100 is in contact with the other one of the stator 200 and the rotor 300.

The air gap protection device 100 is provided to be in contact with one of the stator 200 and the rotor 300, and the air gap protection device 100 rotates relative to the other one of the stator 200 and the rotor 300 when the air gap protection device 100 is in contact with the other one of the stator 200 and the rotor 300, so that a normal relative rotation relation of the stator 200 and the rotor 300 can be guaranteed. In addition, the radial distance between the air gap protection device 100 and the other one of the stator 200 and the rotor 300 is less than the radial distance between the stator 200 and the rotor 300. Therefore, in case that the rotor 300 rotates eccentrically and the radial distance between the stator 200 and the rotor 300 is reduced during the relative rotation of the rotor 200 and the stator 300, it can be guaranteed that the air gap protection device 100 is first in contact with one of the stator 200 and the rotor 300, and the stator 200 is not in contact with the rotor 300, which avoids the occurrence of sweep-chamber, and it can be guaranteed that the device with the stator and the rotor cannot be damaged, that is, effective protection can be provided when the air gap between the stator 200 and the rotor 300 is too small, which improves the operation stability of the device with the stator and the rotor.

The device with the stator and the rotor in this embodiment is a generator. Specifically, the generator in this embodiment is a wind generator with a structure of an outer rotor and an inner stator. As an alternative embodiment, the device with stator and rotor can also be a wind generator with a structure of an outer stator and an inner rotor, or other forms of generator. As an alternative embodiment, the device with stator and rotor can also be a motor or other device with a stator and a rotor, and a device capable of supporting the air gap when the air gap between stator and rotor becomes smaller in order to guarantee the normal operation of the stator and the rotor is needed.

The air gap protection device 100 in this embodiment is fixedly connected to the stator 200, a radial distance A between the air gap protection device 100 and the rotor 300 is less than the radial distance between the stator 200 and the rotor 300; and the air gap protection device 100 rotates relative to the rotor 300 when being in contact with the rotor 300. As an alternative embodiment, the air gap protection device 100 may also be fixedly connected to the rotor 300, and a radial distance between the air gap protection device 100 and the stator 200 is less than the radial distance between the stator 200 and the rotor 300; and the air gap protection device 100 rotates relative to the stator 200 when being in contact with the stator 200.

Specifically, as shown in FIG. 1, the air gap protection device 100 in this embodiment includes: a body 101 which is fixedly connected to the stator 200; multiple rotating structures, which are connected to an end, close to the rotor 300, of the body 101, where a radial distance between the rotor 300 and each rotating structurer is less than the radial distance between the stator 200 and the rotor 300. The air gap protection device 100 is configured to include the body 101 which is fixedly connected to the stator 200 and the multiple rotating structures, so that the body 101 can be fixed to the stator 200, the multiple rotating structures can rotate relative to the rotor 300, so that the stator 200 and the rotor 300 cannot be affected when realizing their respective functions, which improves the stability of the stator 200 and the rotor 300. As an alternative embodiment, the number of the rotating structure may be one, two or more, which can be set according to the actual needs.

Each rotating structure in this embodiment has an cylindrical structure with an axis arranged along an axial direction of the air gap protection device 100, and a surface of each rotating structure facing the rotor 300 is a mating surface, a line on the mating surface with a smallest distance to the rotor 300 is a mating line, and a curved surface passing through all the mating lines and a curved surface of the rotor 300 facing the stator 200 are arranged concentrically. The axial direction of the air gap protection device 100 is the same with an axial direction of a motor of the generator. Each rotating structure is configured to be in cylindrical structure, and the curved surface passing through all the mating lines and the curved surface of the rotor 300 facing the stator 200 are arranged concentrically, so that the two curved surfaces are more compatible, a contact area between the rotor 300 and each rotating structure is larger, and the friction force per unit area between the rotor 300 and each rotating structure is smaller. Therefore, the rotor 300 rotates more smoothly. As an alternative embodiment, the rotating structure may have a spherical structure, a surface of each rotating structure facing the rotor 300 is a mating surface, and a point on the mating surface with a smallest distance to the rotor 300 is a mating point, and a curved surface passing through all the mating points and a curved surface of the rotor 300 facing the stator 200 are arranged concentrically.

A maximum gap between each rotating structure and the rotor 300 in a radial direction is set within an allowable value range of the air gap. In the design stage, in order to guarantee the normal operation of the stator 200 and the rotor 300 of each device with the stator and the rotor, the allowable value range of the air gap between the stator 200 and the rotor 300 is a preset air gap range for the normal operation of the stator 200 and the rotor 300. By setting the maximum radial clearance between each rotating structure and the rotor 300 within the allowable value of the air gap, the gap between each rotating structure and the rotor 300 can meet the requirements of the normal operation when the stator 200 and the rotor 300 are in normal operation, which guarantees the normal operation of the stator 200 and the rotor 300.

Each rotating structure in this embodiment is made of wear-resistant non-metallic material. With each rotating structure being made of wear-resistant non-metallic material, each rotating structure has a good lubrication performance, less elastic modulus and less impact and friction resistance when the rotor 300 is in contact with the rotating structure. Specifically, each rotating structure in this embodiment is made of polyurethane (PU). As an alternative embodiment, the rotating structure may also be made of polyether ether ketone (PEEK). Alternatively, the rotating structure is made of metal.

Each rotating structure in this embodiment includes a rotating shaft 104 which is fixedly connected to the body 101; and a rotating portion, which is connected to the body 101, is coaxially arranged outside the rotating shaft 104, and is configured to rotate relative to the rotating shaft 104. As an alternative embodiment, the rotating shaft 104 may be fixedly connected to the rotating portion, and the rotating shaft 104 rotates relative to the body 101.

Specifically, each rotating structure includes: a bearing, which is fixedly connected to the rotating shaft 104 and is arranged between the rotating shaft 104 and the rotating portion, so as to provide a rotating pair and improve a radial accuracy. In a preferred embodiment, the bearing is a sliding bearing. As an alternative embodiment, the bearing may also be a rolling bearing.

In order to fixedly connect the rotating shaft 104, the air gap protection device 100 in this embodiment further includes two upper positioning plate and a lower positioning plate 103, which are respectively connected to an upper side and a lower side of the body 101, and the two positioning plates 103 are fixedly connected to two ends of the multiple rotating shafts 104. The two positioning plates 103 are fixedly connected on the two sides of the body 101, and the two positioning plates 103 are fixedly connected to the rotating shafts 104, so that the two positioning plates 103 can fix the two ends of the rotating shafts 104, which can prevent the rotating shafts 104 from sliding off the body 101 axially, and can facilitate disassembly and assembly. Specifically, the positioning plates 103 and the body 101 in the present embodiment are fixedly connected by a first bolt 102. As an alternative embodiment, a positioning plate 103 can also be respectively arranged at an upper end and a lower end of each rotating shaft 104 for fixation. As an alternative embodiment, instead of providing the positioning plate, the rotating shaft 104 can be directly welded to the body 101, so as to prevent the rotating shaft 104 from moving axially or circumferentially.

Figure 2:
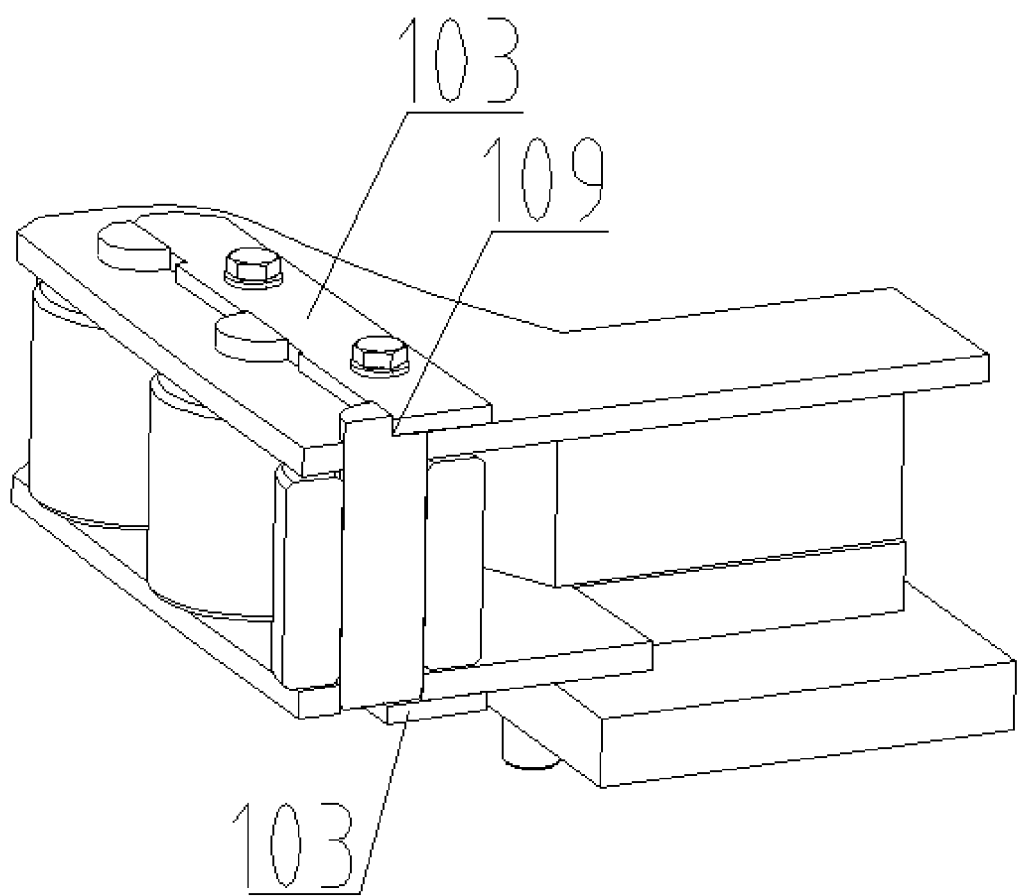
FIG. 2 is a sectional view of the air gap protection device according to the present disclosure.

As shown in FIG. 2, the upper end of each rotating shaft 104 in this embodiment is provided with a stepped boss 109, the upper positioning plate 103 is pressed against the end of the rotating shaft 104, and the positioning plate 103 is provided with a groove which is matched and connected with the boss. The stepped boss 109 and the groove which are matched and connected are provided on the end of each rotating shaft 104 and the positioning plate 103, and the positioning plate 103 is pressed against the end of the rotating shaft 104, which can prevent the rotating shaft from rotating circumferentially, so that the rotating shaft is fixed more firmly, and the disassembly and mounting are convenient. As an alternative embodiment, all the upper end and the lower end of each rotating shaft 104 and the two upper and lower positioning plates 103 can also be provided with the boss and the groove which are matched and connected. Alternatively, only the lower positioning plate 103 and the lower end of each rotating shaft 104 are provided with the boss and the groove which are matched and connected. As an alternative embodiment, the positioning plate may be not pressed against the end of the rotating shaft, as long as the positioning plate is fixedly connected to the rotating shaft, such as key connection or tenon connection.

The body 101 in this embodiment is machined from a low carbon steel material after welding, the rotating shaft 104 is machined from a stainless steel material after welding, and the positioning plate 103 is machined from a low carbon steel material after welding. As an alternative embodiment, the body 101 may also be machined from a steel material such as nodular cast iron or cast steel after welding or casting. As an alternative embodiment, the rotating shaft 104 can also be machined from a steel material such as low carbon steel, nodular cast iron or cast steel. As an alternative embodiment, the positioning plate 103 can also be machined from a steel material such as nodular cast iron or cast steel after welding or casting.

The rotating portion in this embodiment is a roller 105. The rotating portion is configured to be the roller 105, so that the friction of the rotor 300 in contact with the rotating portion is rolling friction, and the impact force of the rotor 300 is reduced by using a rotating circumferential surface, which prevents sudden collision between the rotor 300 and the rotating portion, and simplify the structure for realizing the rotation of the rotating portion. As an alternative embodiment, the rotating portion can also be a rotating member which is concentric with the stator 200, one end of the rotating portion is hinged to a center of the stator 200, and the rotating portion can rotate around the center of the stator 200 when the rotor 300 is in contact with the rotating portion.

In order to facilitate the fixed connection with the stator 200, an end of the body 101 away from the rotor 300 in this embodiment is provided with a protruding portion 107 and two fixing brackets 110, the two fixing brackets 110 are respectively arranged on two sides of the protruding portion 107, and the two fixing brackets 110 are fixedly connected to the stator 200. Specifically, the two fixing brackets 110 and the stator 200 are fixedly connected through a second bolt 106. As an alternative embodiment, the number of the fixing bracket 110 may be one or more.

Figure 3:
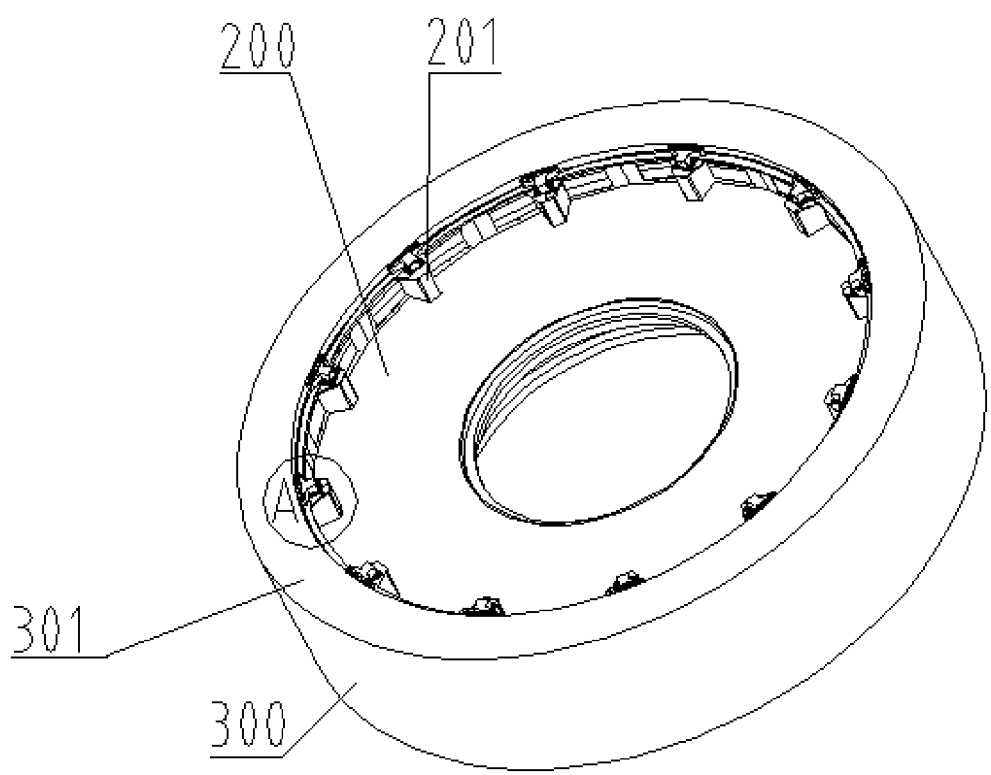
FIG. 3 is a schematic structural view of a wind generator according to the present disclosure.
Figure 4:
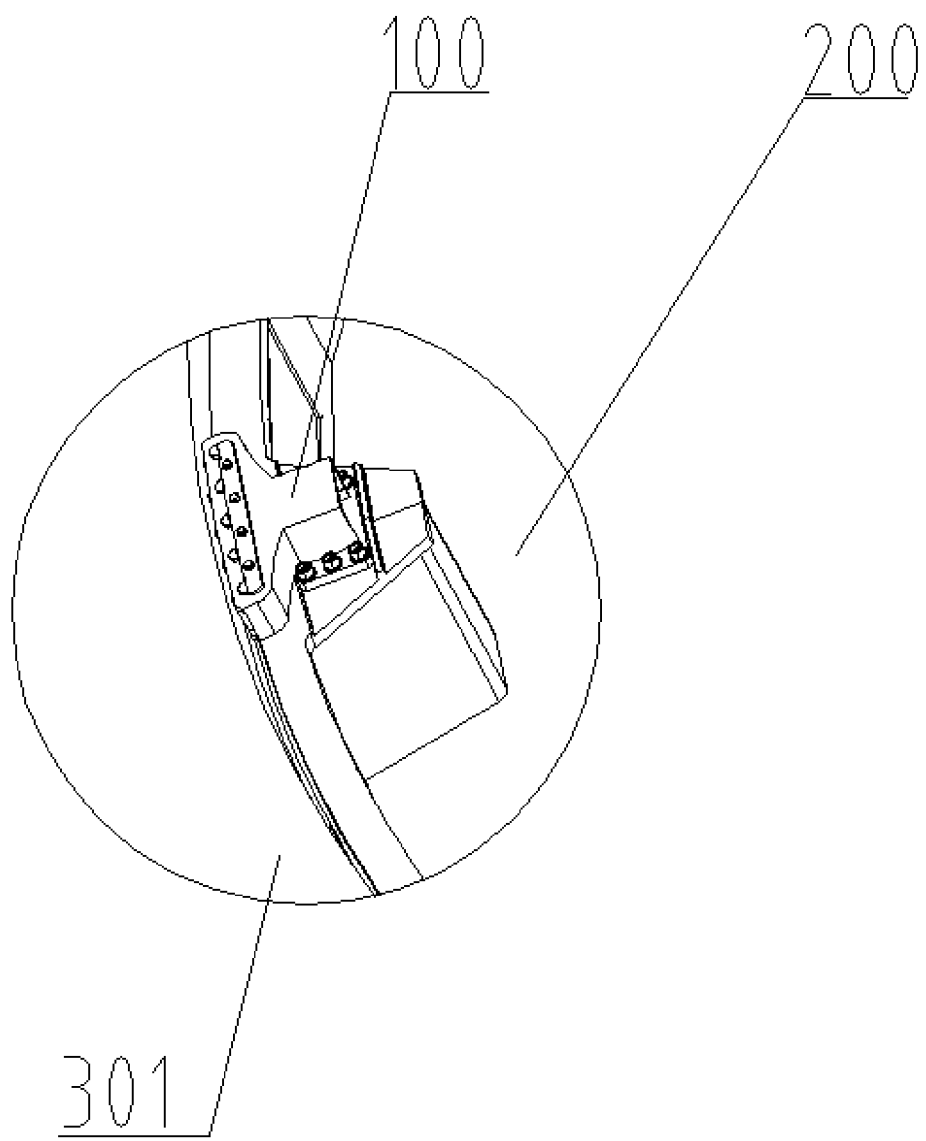
FIG. 4 is an enlarged view of portion D in FIG. 3.

As shown in FIG. 3, at least four protruding portions 201 are evenly provided in an end surface of the stator along a circumferential direction, and each protruding portion 201 is fixedly connected to the air gap protection device 100. The at least four protruding portions 201 are evenly provided on the end surface of the stator 200 along the circumferential direction, and each protruding portion 201 is fixedly connected to the air gap protection device 100, so that the stator 200 is provided with one air gap protection device 100 at most every 90 degrees along the circumferential direction, the rotor 300 can firstly in contact with the roller 105 of the air gap protection device 100 no matter which part in the circumferential direction the rotor 300 is close to the stator 200 when the rotor 300 is eccentric, which can guarantee the normal operation of the stator 200 and the rotor 300. Specifically, the protruding portions 201 in this embodiment are protruding blocks, and the number of the protruding blocks and the gap protection devices 100 are twelve. As an alternative embodiment, the number of the protruding blocks and the gap protection devices 100 can be four, five, or six, or the number of the air gap protection devices 100 can be designed according to specific requirements to, for example, load.

Figure 5:
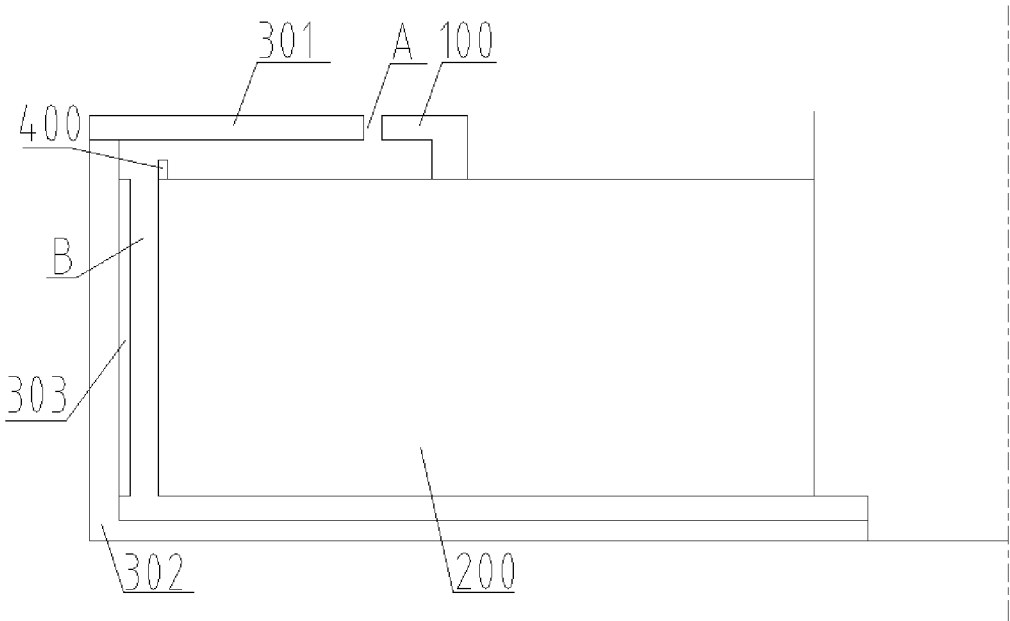
FIG. 5 is a schematic structural view of the wind generator according to the present disclosure.

As shown in FIG. 5, the rotor 300 in this embodiment includes a rotor end cover 301, a rotor bracket 302 which is arranged fixedly connected to the rotor end cover 301, and a magnetic yoke. The magnetic yoke is arranged on the rotor bracket 302, a magnetic pole 303 is provided on the magnetic yoke, and an air gap is formed between the magnetic pole 303 and the stator 200. The rotor end cover 301 is higher than the end surface of the rotor 200, the rotor end cover 301 is arranged spaced apart from the roller of the air gap protection device 100, and the air gap protection device 100 is fixed to the end surface of the stator 200. In order to prevent unnecessary friction resistance caused by the contact between the air gap protection device 100 and the end cover of the rotor 300 during normal operation of the generator, it should guarantee there is a certain gap between the roller 105 and the rotor end cover 301 of the generator when the air gap protection device 100 is mounted. A size of the gap is determined according to the allowable value of the air gap between the stator 200 and the rotor 300 of the generator.

During the operation of the generator, the rotor end cover 301 of the generator may be in contact with the roller 105 of the generator when the air gap between the rotor 300 and the stator 200 becomes smaller, so as to guarantee that the air gap cannot continue to decrease, avoid the contact between the magnetic yoke on the rotor bracket 302 and the stator 200, and avoid the occurrence of faults such as sweep-chamber of the generator. Since the roller 105 can rotate around the rotating shaft 104, the movement of the rotor 300 of the generator may not be affected even if the rotor end cover 301 of the generator is in contact with the roller 105, which can reduce the contact force when the rotor end cover 301 is in contact with the air gap protection device 100. In addition, since the air gap protection device 100 is mounted on the end face of the stator 200, which does not occupy the space inside the stator 200 and the rotor 300, and thus it does not need to modify the structures of the stator 200 and the rotor 300, and the mounting difficulty is small. Moreover, since the axis of the roller 105 is in an axial direction of the generator, the circumferential surface of the roller 105 is in contact with the rotor end cover 301 when the air gap of the generator varies, which has a small wear, no need for maintenance with a long service life.

In order to monitor the air gap between the stator 200 and the rotor 300, the generator further includes a displacement sensor 400 which is fixedly connected to the stator 200 and is configured to detect the air gap between the stator 200 and the rotor 300. As an alternative embodiment, the generator may also include a pressure-sensitive sensor, and a pressure-sensitive material is coated on an outer surface of the roller 105. The rotor end cover 301 of the generator may be in contact with the roller 105 of the air gap protection device 100 when the air gap between the rotor 300 and the stator 200 becomes smaller. It is detected that the rotor end cover 301 is in contact with the roller 105 when the pressure-sensitive material detects a change in the pressure value. Alternatively, the generator includes both the displacement sensor 400 and the pressure-sensitive sensor.

Figure 6:
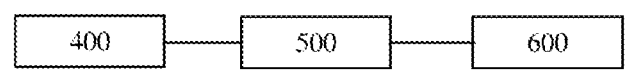
FIG. 6 is a schematic view showing partial control connection of the wind generator according to the present disclosure.

As shown in FIG. 6, the generator includes: a control device 500 and an alarm device 600. The control device 500 is a main controller of the generator. The control device 500 is connected to the displacement sensor 400. In case that the control device 500 detects that the air gap between the stator 200 and the rotor 300 is less than a preset value (that is, the allowable value), which indicates that the air gap protection device 100 fails, the control device 500 controls the alarm device 600 to alarm. Specifically, the alarm device 600 may be a sound alarm and/or a light alarm, and the alarm device 600 sends out sound and/or light to remind a wind farm control center or an operation and maintenance personnel to perform maintenance.

A wind generating set is provided according to the embodiment of the present disclosure, which includes the above generator.

Apparently, the above embodiments are only examples for clear description, rather than a limitation of the implementations. For those of ordinary skill in the art, other changes or modifications in different forms can be made on the basis of the above description. It is unnecessary and impossible to list all the implementations here. The obvious changes or modifications derived thereby are still within the scope of protection created in this application.

What is claimed is:

1. A device with a stator and a rotor, comprising:
   the stator;
   the rotor, wherein an air gap is formed between the rotor and the stator in a radial direction of the stator and the rotor; and
   an air gap protection device fixedly connected to one of the stator and the rotor, wherein a radial distance is formed between the air gap protection device and the other one of the stator and the rotor in the radial direction of the stator and the rotor, and the radial distance is less than a radial distance between the stator and the rotor;
   wherein the air gap protection device is configured to be in contact with the other one of the stator and the rotor and the air gap protection device rotates relative to the other one of the stator and the rotor in case that the rotor rotates eccentrically and the radial distance between the stator and the rotor is reduced.

2. The device with the stator and the rotor according to claim 1, wherein the air gap protection device comprises:
   a body fixedly connected to the stator; and
   at least one rotating structure, which is connected to an end of the body close to the rotor, wherein a radial distance between the rotor and the at least one rotating structure is less than the radial distance between the stator and the rotor.

3. The device with the stator and the rotor according to claim 2, wherein a maximum gap between the at least one rotating structure and the rotor in a radial direction is set within an allowable value range of the air gap.

4. The device with the stator and the rotor according to claim 2, wherein the number of the at least one rotating structure is greater than one, each rotating structure has an cylindrical structure with an axis arranged along an axial direction of the air gap protection device, a surface of each rotating structure facing the rotor is a mating surface, a line on the mating surface with a smallest distance to the rotor is a mating line, and a curved surface passing through all the mating lines and a curved surface of the rotor facing the stator are arranged concentrically.

5. The device with the stator and the rotor according to claim 2, wherein the number of the at least one rotating structure is greater than one, each rotating structure has a spherical structure, a surface of each rotating structure facing the rotor is a mating surface, a point on the mating surface with a smallest distance to the rotor is a mating point, a curved surface passing through all the mating points and a curved surface of the rotor facing the stator are arranged concentrically.

6. The device with the stator and the rotor according to claim 2, wherein the at least one rotating structure is made of wear-resistant non-metallic material.

7. The device with the stator and the rotor according to claim 6, wherein the at least one rotating structure is made of polyurethane or polyether ether ketone.

8. The device with the stator and the rotor according to claim 2, wherein each rotating structure comprises:
a rotating shaft fixedly connected to the body;
a rotating portion, which is connected to the body and coaxially arranged outside the rotating shaft, and is configured to rotate relative to the rotating shaft when the rotating portion is in contact with the rotor.

9. The device with the stator and the rotor according to claim 8, wherein each rotating structure further comprises:
a bearing fixedly connected to the rotating shaft and arranged between the rotating shaft and the rotating portion.

10. The device with the stator and the rotor according to claim 8, wherein the air gap protection device further comprises at least two positioning plates, which are respectively connected to two sides of the body, and the at least two positioning plates are fixedly connected to the rotating shaft.

11. The device with the stator and the rotor according to claim 10, wherein at least one end of the rotating shaft is provided with a stepped boss or a groove, the positioning plate is pressed against the at least one end of the rotating shaft, and the positioning plate is provided with a groove or a boss which is matched and connected with the boss or the groove.

12. The device with the stator and the rotor according to claim 8, wherein the rotating portion is a roller.

13. The device with the stator and the rotor according to claim 2, wherein an end of the body away from the rotor is provided with a protruding portion and at least one fixing bracket, the at least one fixing bracket is arranged on at least one side of the protruding portion, and the at least one fixing bracket is fixedly connected to the stator.

14. The device with the stator and the rotor according to claim 13, wherein the at least one fixing bracket is fixedly connected to the stator through a second bolt.

15. The device with the stator and the rotor according to claim 1, wherein at least four protruding portions are evenly provided in an end surface of the stator along a circumferential direction, and each protruding portion is fixedly connected to the air gap protection device.

16. The device with the stator and the rotor according to claim 2, wherein the rotor comprises:
a rotor end cover arranged spaced apart from the at least one rotating structure;
a rotor bracket fixedly connected to the rotor end cover; and
a magnetic yoke arranged on the rotor bracket, wherein a magnetic pole is provided on the magnetic yoke, and an air gap is formed between the magnetic pole and the stator.

17. The device with the stator and the rotor according to claim 1, wherein the device with the stator and the rotor is a generator.

18. The device with the stator and the rotor according to claim 17, wherein the generator comprises:
a displacement sensor, wherein the displacement sensor is fixedly connected to the stator and configured to detect the air gap between the stator and the rotor.

19. The device with the stator and the rotor according to claim 18, wherein the generator comprises:
a control device connected to the displacement sensor;
an alarm device connected to the control device;
wherein the control device is configured to control the alarm device to send an alarm signal when a detection value of the displacement sensor is less than a preset value.

20. A wind generating set, comprising the device with the stator and the rotor according to claim 1.

* * * * *